(12) United States Patent
Li et al.

(10) Patent No.: US 9,575,821 B2
(45) Date of Patent: Feb. 21, 2017

(54) METHOD AND DEVICE FOR PREVENTING WINDOW'S LAGGING

(71) Applicant: BEIJING QIHOO TECHNOLOGY COMPANY LIMITED, Beijing (CN)

(72) Inventors: Baosheng Li, Beijing (CN); Zhi Chen, Beijing (CN); Peng Sun, Beijing (CN); Huan Ren, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 275 days.

(21) Appl. No.: 14/369,183

(22) PCT Filed: Dec. 26, 2012

(86) PCT No.: PCT/CN2012/087534
§ 371 (c)(1),
(2) Date: Jun. 26, 2014

(87) PCT Pub. No.: WO2013/097720
PCT Pub. Date: Jul. 4, 2013

(65) Prior Publication Data
US 2015/0007105 A1    Jan. 1, 2015

(30) Foreign Application Priority Data

Dec. 29, 2011  (CN) .......................... 2011 1 0452300

(51) Int. Cl.
*G06F 15/00* (2006.01)
*G06F 13/00* (2006.01)
(Continued)

(52) U.S. Cl.
CPC ............. *G06F 9/542* (2013.01); *G06F 3/0481* (2013.01); *G06F 9/4443* (2013.01);
(Continued)

(58) Field of Classification Search
CPC ........................... G06F 17/3061; G06F 9/4443
(Continued)

(56) References Cited

U.S. PATENT DOCUMENTS 5,488,570 A * 1/1996 Agarwal .................. H04N 7/15
345/501
5,506,954 A * 4/1996 Arshi ........................ G06T 1/00
345/501
(Continued)

FOREIGN PATENT DOCUMENTS

CN          101609470 A    12/2009
CN          102027454 A    4/2011
WO     WO 2010/083772 A1    7/2010

*Primary Examiner* — Kevin Nguyen
(74) *Attorney, Agent, or Firm* — Baker & Hostetler LLP

(57) ABSTRACT

The present application provides a method and a device for preventing window's lagging, and relates to the field of computer technology. The method comprises: when a child window is created by a thread, a middle window being firstly created in a thread different from the thread in which each child window of a window system is positioned, wherein the middle window is the parent window of the child window currently created, the parent window of the middle window is a frame parent window, and the thread in which the child window currently created is positioned differs from the thread in which the frame parent window is positioned; if window's lagging of a child window occurs, a window's lagging message of the child window in which window's lagging occurs being sent to the thread in which the corresponding middle window is positioned; and the middle window and the child window in which window's lagging occurs are separated from a window frame by the thread in which the middle window is positioned. By the present application, the middle window corresponding to the child window in which window's lagging occurs can be separated from the window system; the window's lagging state of the
(Continued)

integral window system caused by the window's lagging of the child window is avoided; and the window's lagging problem of the integral window system caused by the window's lagging of the child window in the windows system of the Windows is solved.

20 Claims, 4 Drawing Sheets

(51) Int. Cl.
  *G06F 9/54* (2006.01)
  *G06F 9/50* (2006.01)
  *G09G 5/14* (2006.01)
  *G06F 3/0481* (2013.01)
  *G06F 9/44* (2006.01)

(52) U.S. Cl.
  CPC ............. *G06F 9/5027* (2013.01); *G09G 5/14* (2013.01); *G06F 2209/5018* (2013.01); *G06F 2209/545* (2013.01); *G09G 2340/12* (2013.01)

(58) Field of Classification Search
  USPC ........ 715/763–765, 209, 851–853, 740–743, 715/780, 788
  See application file for complete search history.

(56) References Cited

U.S. PATENT DOCUMENTS

| | | | | |
|---|---|---|---|---|
| 5,920,325 | A | * | 7/1999 | Morgan ................. G06T 13/00 345/473 |
| 2004/0139396 | A1 | * | 7/2004 | Gelernter ............ G06F 17/3061 715/209 |
| 2005/0229108 | A1 | * | 10/2005 | Sadek .................. G06F 9/4443 715/764 |

* cited by examiner

```
┌─────────────────────────────────────────────────────────────┐
│ when a child window is created by a thread, a middle window is │
│ firstly created in a thread different from the thread in which each │──110
│   child window of a window system is positioned, wherein the │
│      middle window is the parent window of the child window │
│ currently created, the parent window of the middle window is a │
│ frame parent window, and the thread in which the child window │
│ currently created is positioned differs from the thread in which │
│          the frame parent window is positioned              │
└─────────────────────────────────────────────────────────────┘
                              │
┌─────────────────────────────────────────────────────────────┐
│ whether window's lagging of each child window occurs or not is │──120
│      detected, if window's lagging of the child window occurs, a │
│ window's lagging message of the child window in which window's │
│   lagging occurs is sent to the thread in which the corresponding │
│              middle window is positioned                    │
└─────────────────────────────────────────────────────────────┘
                              │
┌─────────────────────────────────────────────────────────────┐
│   the middle window and the child window in which window's │──130
│   lagging occurs are separated from the window frame by the │
│      thread in which the middle window is positioned        │
└─────────────────────────────────────────────────────────────┘
```

FIG. 1

METHOD AND DEVICE FOR PREVENTING WINDOW'S LAGGING

CROSS-REFERENCE TO RELATED APPLICATIONS

This application is the National Stage of International Application No. PCT/CN2012/087534, filed Dec. 26, 2012, which claims the benefits of Chinese Patent Application No. 201110452300.X, filed Dec. 29, 2011, the disclosures of which are incorporated herein by reference in their entireties.

TECHNICAL FIELD

The present invention relates to computer technology field, and in more particular, to a method and a device for preventing window's lagging.

BACKGROUND ART

Windows client software is designed based on window structure. Parent-child relationship, brother relationship, and etc, may exist between the windows. Based on these relationships, Windows operating system may manage display, focus, size, and etc. of windows, which greatly alleviates the windows developers' workload. For example: if a parent window is hidden, all child windows thereof would also be hidden and the focus of the windows would be lost, which are achieved under the Windows operating system.

This design also has some side effects. One of the most serious problems is ire that: once a child window experiences temporary lockup, the parent window would be locked up as well. For example: in the case that window's lagging and endless loop, etc. of a child window occur during a message processing, if the parent window is operated, such as changing the size of the parent window, displaying, hiding the parent window or setting the attribute of the parent window, window's lagging would occur in the parent window too, causing window's lagging of the integral window system occurs; then a user has to restart a windows if a new window is to be opened, which causes great inconvenience to the user. Herein window's lagging is a problematic status of the window system, showing that interfaces cannot be refreshed, buttons have no response to cocks and any of the operations fails to be performed.

For example, in a multi-tab browser, both the browser child window and the browser parent window of the browser frame are in a same thread. When a problem occurs in the browser child window, it would directly lead to window's lagging of the integral browser parent window, or even crash, that is, the integral browser is caused to be window's lagging state.

In the prior art, by arranging the parent window and the child window in different processes or threads, this could partially solve the problem that the frame parent window takes on window's lagging once window's lagging of the child window occurs. When window's lagging of a child window occurs, the thread in which the child window is positioned would fail to handle any message. At that time, if the thread in which the frame parent window is positioned does not send synchronization messages to the child window, the parent window can still respond to the user's operation. In this solution, since the Windows operating system would do a lot of logical processing to the windows that have parent-child relationship and brother relationship (for example, when the parent window is hidden, all the child windows of the parent window would be hidden, etc.), once window's lagging of a certain child window occurs, in the case that the parent window is hidden, the parent window would still send synchronous messages to the child window in which window's lagging occurs. Thus, since window's lagging of the child window occurs, window's lagging of the parent window would also occur, resulting in window's lagging of the integral window system occurs, that is, the integral window system is in the window's lagging state. For example, if window's lagging of the child window of the current tag of the browser occurs, when the browser frame parent window is hidden, synchronous messages would be sent to the child window which is in the window's lagging state, causing window's lagging of the integral browser.

SUMMARY OF THE INVENTION

In view of the above problems, the present invention is proposed to provide a device for preventing window's lagging and a corresponding method for preventing window's lagging to overcome the above problems or at least partially solve or relieve the above problems.

According to one aspect of the present invention, a method for preventing window's lagging is provided, which comprises:

when a child window is created by a thread, a middle window being firstly created in a thread different from the thread in which each child window of a window system is positioned, wherein the middle window is the parent window of the child window currently created, the parent window of the middle window is a frame parent window, and the thread in which the child window currently created is positioned differs from the thread in which the frame parent window is positioned;

detecting whether window's lagging occurs in each child window or not, if window's lagging occurs in a child window, a window's lagging message of the child window in which window's lagging occurs being sent to the thread in which the corresponding middle window is positioned; and the middle window and the child window in which window's lagging occurs are separated from a window frame by the thread in which the middle window is positioned.

According to another aspect of the present invention, a device for preventing window's lagging is provided, which comprises:

a middle window creation module, configured to create a middle window in a thread different from the thread in which child window is positioned, wherein the middle window is the parent window of the child window, the parent window of the middle window is a frame parent window, and the thread in which the child window is positioned differs from the thread in which the frame parent window is positioned;

a window's lagging detection module, configured to detect whether window's lagging occurs in each child window or not, if window's lagging occurs in the child window, send a window's lagging message of the child window in which window's lagging occurs to the thread in which the corresponding middle window is positioned; and a separation module, configured to separate the middle window and the child window in which window's lagging occurs from a window frame by the thread in which the middle window is positioned.

According to still another aspect of the present invention, a computer program is provided, which comprises computer readable codes, wherein when the computer readable codes are operated on a computer device, the computer device executes the method for preventing window's lagging which comprises:

when a child window is created by a thread, a middle window being firstly created in a thread different from the thread in which each child window of a window system is positioned, wherein the middle window is the parent window of the child window currently created, the parent window of the middle window is a frame parent window, and the thread in which the child window currently created is positioned differs from the thread in which the frame parent window is positioned;

detecting whether window's lagging of each child window occurs or not, if window's lagging of a child window occurs, a window's lagging message of the child window in which window's lagging occurs being sent to the thread in which the corresponding middle window is positioned; and the middle window and the child window in which window's lagging occurs are separated from a window frame by the thread in which the middle window is positioned.

According to further still another aspect of the present invention, a computer readable medium is provided, in which the computer program is stored, wherein the computer program comprises a computer readable code, wherein when the computer readable code is run on a computer device, the computer device executes a method for preventing window's lagging, comprising:

when a child window is created by a thread, a middle window being firstly created in a thread different from the thread in which each child window of a window system is positioned, wherein the middle window is the parent window of the child window currently created, the parent window of the middle window is a frame parent window, and the thread in which the child window currently created is positioned differs from the thread in which the frame parent window is positioned;

detecting whether window's lagging of each child window occurs or not, if window's lagging of a child window occurs, a window's lagging message of the child window in which window's lagging occurs being sent to the thread in which the corresponding middle window is positioned; and the middle window and the child window in which window's lagging occurs are separated from a window frame by the thread in which the middle window is positioned.

The advantageous effects of the present invention are as follows:

In the present invention, a middle window is created in a thread different from the thread in which a child window is positioned, wherein the middle window is deemed as the parent window of the child window, and the frame parent window is set to be the parent window of the middle window. In the circumstances, if window's lagging of the child window occurs, the middle window corresponding to the child window in which window's lagging occurs is separated from the window system, thus the function of separating the child window in which window's lagging occurs is achieved, and the window's lagging state of the integral window system caused by the window's lagging of the child window is avoided.

The above description is merely an overview of the solution of the present invention. In order to more clearly understand the solution of the present invention to implement in accordance with the contents of the specification, and to make the foregoing and other objects, features and advantages of the invention more apparent, detailed embodiments of the present invention will be provided hereinafter.

BRIEF DESCRIPTION OF THE DRAWINGS

Various other advantages and benefits will become apparent to the person skilled in the art by reading the detailed description of the preferred embodiments hereinafter. The accompanied drawings are only for the purpose of illustrating the preferred embodiments, while not considered as limiting the present invention. Moreover, the same parts are denoted by the same reference symbols throughout the drawings. In the accompanied drawings:

FIG. 1 schematically shows a flow chart of a method for preventing window's lagging according to an embodiment of the present invention;

DETAILED DESCRIPTION OF THE EMBODIMENTS

Figure 2:
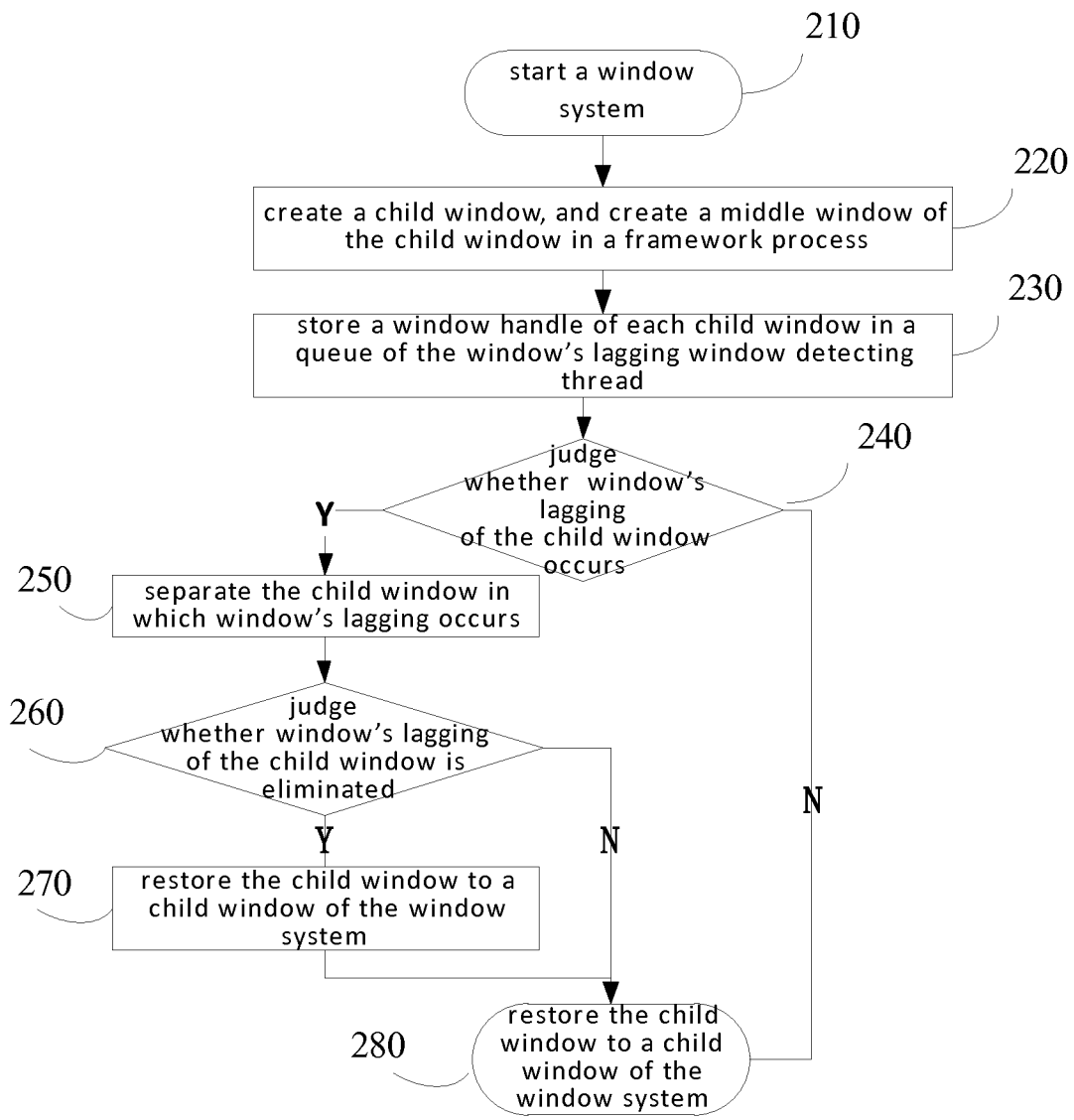
FIG. 2 schematically shows a flow chart of a method for preventing window's lagging according to an embodiment of the present invention.

The present invention will be further described in conjunction with the accompanying drawings and specific embodiments.

Under the Windows system, all programs of windows (i.e., windows that are displayable to users and are operable) are driven by messages, that is, various kinds of messages are generated when a user operates a mouse and a keyboard, and these messages are distributed to a windows in focus only one window is in focus in a system at the same moment) in the current system. Upon the receipt of messages, the current windows in focus may make different responses according to different types of the messages. For example, messages may be generated by clicking the mouse and pressing the keyboard, etc. Application programs may constantly respond to the messages, refresh interface and then complete the operation.

A manner of processing messages within the system is as follows: the system constantly pushes the messages in a message queue, and each of executing threads with windows has a message loop which constantly acquires messages from the message queue to process the messages. However, if the message processing portion is blocked and unfinished, the message loop may fail to acquire new messages. At this time, there is no response to the operation of the interface, that is the window's lagging occurs.

Windows client software is designed based on a window structure, that is, under the Windows system, parent-child relationship and brother relationship, etc. may exist between the windows. The parent-child relationship between the parent-child windows is: when the parent window is moved, the child window must also be moved; when the parent window is hidden, the child window must also be hidden. In the multi-thread Windows environment, i.e., the parent-child windows being in different threads, since the Windows system manages the parent-child windows based on the parent-child relationship, the message loop of the thread in which the child window is positioned is in the message loop of the thread in which the parent window is positioned; if window's lagging of the child window occurs, i.e., the thread in which the child window is positioned is blocked, when the parent window performs actions of hiding or the like and the thread in which the parent window is positioned sends messages to the thread in which the child window is positioned according to the parent-child relationship to perform processing, the process in which the child window is positioned may fail to process the messages due to the blockage of the thread in which the child window. Thus the response message responded to process the messages cannot be sent to the thread in which the parent window is positioned, leading to the blockage of the process in which the parent window is positioned, whereby resulting in the window's lagging of the integral window system. However, the present application is based on the practical operating principle of the window in the Windows system, in which, when window's lagging of the child window occurs, the child window may be detached from the window system, i.e., the relationship between the child window in which window's lagging occurs and the frame parent window is separated. As such, the message of the child window is independent from that of the parent window, and then the integral window system may be prevented from window's lagging.

Referring to FIG. 1, it schematically shows a flow chart of a method for preventing window's lagging according to the present application, which comprises:

Step 110, when a child window is created by a thread, a middle window is firstly created in a thread different from the thread in which each child window of a window system is positioned, wherein the middle window is the parent window of the child window currently created, the parent window of the middle window is a frame parent window, and the thread in which the child window currently created is positioned differs from the thread in which the frame parent window is positioned.

For a window system, the window system may have a plurality of processes after it starts, and each process may have a plurality of threads to manage the frame parent window and each child windows in the window system. After the window system starts, for the child window created by a thread B in the window system, a middle window is created in a thread of the window system which differs from those create each child window. The middle window is the parent window of the child window created in the thread B, and the middle window is the child window of the frame parent window. Herein, the thread in which the child window is positioned is also different from the thread in which the frame window is positioned.

For example, for a browser, when a browser frame starts, a browser frame parent window is created by a thread TA of a process PA of the browser. When a browser child window is created, for example, a child window W1 is created by a thread TB of the processes PA, a middle window M1 is firstly created by a thread such as a thread TA different from the thread TB, wherein, the middle window M1 is set to be the parent window of the child window W1, while the frame parent window is set to be the parent window of the middle window. Herein the middle window may also be created by a thread TC which does not create and manage any other child windows; if the thread TC creates the child window W2, for the above-mentioned child window W1, the thread TC cannot be used to create the middle window of the child window W1.

In the above, there are two methods for setting parent-child relationship of windows:

```
1: Createwindow
HWND hWnd = Create Window (szAppName,        // window
class name
    TEXT ("360se child"), // window caption
    dwStyle,                // window style
    100,                    // initial x position
    100,                    // initial y position
    500,                    // initial x size
    500,                    // initial y size
    (HWND)g__hWndParent,              //parent window handle
    NULL,                   // window menu handle
    g__hInstance,                     // program instance handle
    NULL);                  //creation parameters
2: the parent window is not provided when creating a window but
provided after creating a window.
    SetParent(hwnd, hParent);
```

For each of the child windows of the browser, the same settings as described above may be conducted by creating a middle window through a thread different from the thread in which the child window is positioned. For example, for the child window W2 which is in a thread TC, a middle window M2 may be created by a thread TA, the middle window M2 is set to be the parent window of the child window W2, while the frame parent window is set to be the parent window of the middle window.

The present application does not limit whether the thread in which the middle window is positioned is different from the thread in which the frame parent window is positioned, as long as it is ensured that the thread in which the child window is positioned is different from the respective threads in which the middle window and the frame parent window are positioned. In the above example, the frame parent window is positioned in thread TA, the child window is positioned in thread TB, and the middle window is positioned in thread TA, wherein the middle window may be created by other threads which have not created the child window.

In addition, the present application does not limit the respective processes in which the child window, the middle window and the frame parent window are positioned. In the practical application, a window frame may include a plurality of processes, for example, a browser frame includes a process PA and a process PB, and the process in which the child window W1 is positioned may be either in the process PA or the process PB, the process in which the middle window M1 is positioned may be either in the process PA or the process PB, the process in which the frame parent window is positioned may be either in the process PA or the process PB.

Step 120, whether window's lagging of each child window occurs or not is detected, if window's lagging of the child window occurs, a window's lagging message of the child window in which window's lagging occurs is sent to the thread in which the corresponding middle window is positioned.

After the child window is created in the above-mentioned step, a window's lagging detecting thread may be created to detect whether window's lagging of each child window occurs or not. If window's lagging of a certain child window occurs, a message of the child window in which window's lagging occurs is sent to the process in which the middle window of the child window in which window's lagging occurs is positioned.

Preferably, whether window's lagging of each child window occurs or not may be detected through the following steps:

Step 11, start a window's lagging detecting thread after the frame parent window starts.

For example, for a browser, a window's lagging detecting thread is preset, such that after the browser starts, or further after the frame parent window of the browser starts, the window's lagging detecting thread may start.

Step 12, when the child window is created, store a window handle of the child window in a queue of the window's lagging detecting thread.

When a child window is created in the above-mentioned steps, a window handle of the child window is stored in a queue of the window's lagging detecting thread. The window handle is a number having 32 bits, rather than a pointer. The window handle is a sign of identity of the window. When an API function is called, the window handle is used to determine which window uses the API function. Generally, a window handle type is HWND, and further include instance handle HINSTANCE and device context handle HDC, etc. Herein, the handle of the child window may be acquired by the following manners:
1: recording the window handle in creation: for example HWND hWnd=CreateWindow( . . . )
2: acquiring the window handle according to the relationships between the windows:
  For example: getting the parent window, GetParent
    getting all the child windows, EnumThreadWindow
3: getting the window according to the process space of the window: EnumThreadWindow, etc.
4: finding window aperture according to a feature of the window: FindWindow In practice, except the above four manners, there exist other manners to acquire the window handle and the present application is not limited thereto.

Then the window handle may be stored into the queue of the window's lagging detecting thread.

S13, detect a timestamp corresponding to the window handle of each child window, wherein the timestamp is refreshed by the thread in which the child window is positioned; if a time period during which the timestamp corresponding to a window handle has not been refreshed exceeds a threshold, determine window's lagging of the corresponding child window occurs.

In a thread inputting message loop in which a child window is positioned, when a message is received each time, it is indicated that the thread is in an active state and the timestamp corresponding to the child window is refreshed by the thread.

In practice, the window's lagging detecting thread may detect the timestamp corresponding to the window handle of each child window in the queue at intervals. When a time period during which a timestamp corresponding to a window handle has not been refreshed exceeds the threshold, the child window corresponding to the window handle is determined to be window's lagging. For example, assuming that the timestamp corresponding to the window handle of the child window W1 is at 21:50:29, Dec. 24, 2011, and that the window's lagging detecting thread conducts a detection every 1 second, if the timestamp corresponding to the window handle of the child window W1 remains at 21:50: 29, Dec. 24, 2011 after 10 seconds, then the non-refreshing time period of the child window W1 is 10 seconds; assuming that the threshold of the non-refreshing time period is set to be 8 seconds, the non-refreshing time period of the child window W1 exceeds the threshold, whereby determining that the child window W1 to be window's lagging.

Then, the message of the child window in which window's lagging occurs is sent to the process in which the middle window of the child window in which window's lagging occurs is positioned.

Step 130, the middle window and the child window in which window's lagging occurs are separated from the window frame by the thread in which the middle window is positioned.

The separation may include: separating the parent-child relationship between the middle window and the frame parent window, and the connection relationship between the thread inputting message loop of the child window corresponding to the middle window and the thread inputting message loop of the frame parent window corresponding to the middle window.

Preferably, the separation is executed through the following steps:

Step S21, detach the thread inputting message loop of the child window from the thread inputting message loop of the frame parent window.

Preferably, the thread inputting message loop of the child window is detached from the thread inputting message loop of the frame parent window by using the thread in which the middle window is positioned to call a system API function of AttachThreadInput.

In practice, the API function AttachThreadInput includes parameters in Table 1.

TABLE 1

| Parameters | Explanation |
| --- | --- |
| idAttach | an identifier (ID) to be connected to a thread |
| idAttachTo | an identifier of another thread connected to the idAttach thread |
| fAttach | TRUE (non-zero) connection, FALSE (0) disconnection |

The thread inputting message loop of the child window is detached from the thread inputting message loop of the frame parent window through the parameter fAttach, that is, the fAttach is switched to FALSE (0) disconnection.

Step S22, set the parent window of the middle window corresponding to the child window to be null.

For example, such a setting may be executed through a statement "SetParent(m_hWnd, NULL);".

Step S23, set the middle window corresponding to the child window to have an attribute of a non-child window. For example, such a setting may be executed through a statement "SetWindowLong(m_hWnd, GWL_STYLE, WS_POPUP|WS_CLIPSIBLINGS);".

That is, through steps S22 and S23, the middle window corresponding to the child window in which window's lagging occurs is set to have an attribute that the middle window has no the parent window and is a non-child window. Thus, according to the logic of the Windows system, the Windows systems may manage the middle window.

Through the above steps, the parent-child relationship between the middle window corresponding to the child window in which window's lagging occurs and the frame parent window may be separated, such that the thread blocked by the child window in which window's lagging occurs would not interfere with the thread of the frame parent window, that is, the window system would not go into the window's lagging state.

Additionally, in practice, window's lagging of the child window would be eliminated because of the blockage of the thread is released to be a normal operation state, in this case, preferably, the method further comprises:

Step 140, after window's lagging of the child window is eliminated, restore the parent-child relationship between the middle window and the child window in which window's lagging occurs, and restore the parent-child relationship between the frame parent window and the middle window.

Preferably, the following steps will be used to restore the parent-child relationship between the middle window and the child window in which window's lagging occurs, and restore the parent-child relationship between the frame parent window and the middle window:

Step S31, connect the thread inputting message loop of the child window and the thread inputting message loop of the frame parent window.

Preferably, the thread inputting message loop of the child window and the thread inputting message loop of the frame parent window are connected by using the thread in which the middle window is positioned to call a system API function of AttachThreadInput.

In practice, the thread inputting message loop of the child window is connected to the thread inputting message loop of the frame parent window through the parameter fAttach in the above Table 1, that is, fAttach becomes TRUE (non-zero) connection.

Step S32, set the middle window corresponding to the child window to have an attribute of child window.

Step S33, set the parent window of the middle window corresponding to the child window in which window's lagging occurs to be the frame parent window.

As such, the parent-child relationship between the child window in which window's lagging occurs and the corresponding middle window is restored, and the parent-child relationship between the middle window and the frame parent window is also restored. Again, the child window may be normally operated according to the logic of the Windows system. Furthermore, the Windows system may become more fluent for users.

Additionally, in practice, the thread in which the child window is positioned may create some pop-up windows. These pop-up windows, then, may be generally set to remove the dependency upon the thread in which the frame parent window is positioned but only depend upon the thread which creates these windows. Preferably, this may be executed through the following steps:

S41, inquire whether a current pop-up window exists in a pop-up window list or not, when the pop-up window is created by the thread in which the child window is positioned.

In practice, for example, for a pop-up window of an input method, which is dependent upon both the thread creating the pop-up window in which the child window is positioned and the thread in which the frame parent window is positioned, it may be necessary to change the thread dependence relationship of this kind of pop-up window to only depend upon the thread of the corresponding child window.

In practice, such pop-up windows which may affect the separation of the window in which window's lagging occurs may be determined by pre-testing and stored the pop-up windows into a pop-up window list.

S42, if the current pop-up window exists in the pop-up window list, adjust the current pop-up window to have an attribute of only depending upon the thread in which the child window is positioned.

If the pop-up window which preferably is able to separate the window in which window's lagging occurs exists in the pop-up window list, then adjust the current pop-up window to have an attribute of only depending upon the thread in which the child window is positioned.

For example, in the creation of the window, the parent window of the window is set to NULL.

Subsequently, the setting is executed through a statement "SetParent(m_hWnd, NULL);".

In addition, if the child window exits, then detach the various parent-child relationships corresponding to the child window, and then destroy the child window.

Preferably, step S51, when the child window exits, detach the parent-child relationship between the middle window and the child window, and detach the parent-child relationship between the frame parent window and the middle window.

S52, destroy the child window and the middle window.

In the present application, the frame parent window is a frame parent window of a browser, and the child window is a window of tab page in the browser.

Referring to FIG. 2, it schematically shows a flow chart of a preferred method for preventing window's lagging according to the present invention.

Step 210, start a window system.

For example, while a browser frame starts, a window's lagging detecting thread may start.

Step 220, create a child window, and create a middle window of the child window in a framework process.

When a child windows (such as a window of tab page of a browser) is created by a thread, a middle window is firstly created in a thread different from the thread in which each child windows of the window system is positioned, wherein the middle window is the parent window of the child window currently created, the parent window of the middle window is a frame parent window, and the thread in which the child window currently created is positioned differs from the thread in which the frame parent window is positioned.

Step 230, store a window handle of each child window in a queue of the window's lagging detecting thread.

Step 240, judge whether window's lagging of the child window occurs, and if window's lagging of the child window occurs, go to step 250; otherwise, go to step 280.

A timestamp corresponding to the window handle of each child window may be detected, wherein the timestamp may be refreshed by the thread in which the child windows is positioned; if a time period during which the timestamp corresponding to a window handle has not been refreshed exceeds a threshold, the corresponding child window is determined to be window's lagging.

In a thread inputting message loop in which a child window is positioned, when a message is received each time, it is indicated that the thread is in an active state and the timestamp corresponding to the child window is refreshed by the thread.

In practice, the window's lagging detecting thread may detect the timestamp corresponding to the window handle of each child window in the queue at intervals. When a time period during which a timestamp corresponding to a window handle has not been refreshed exceeds the threshold, the child window corresponding to the window handle is determined to be window's lagging. For example, assuming that the timestamp corresponding to the window handle of the child window W1 is at 21:50:29, Dec. 24, 2011, and that the current detecting time is 21:51:00, Dec. 24, 2011, the time period from the current detecting time to the latest time at which the thread is in active state may be 31 seconds; assuming that the threshold is set to be 30 seconds, the time period exceeds 30 seconds, whereby determining that the window W1 to be window's lagging.

Then, the message of the child window in which window's lagging occurs is sent to the process in which the middle window of the child window in which window's lagging occurs is positioned.

Step 250, separate the child window in which window's lagging occurs.

Preferably, the separation is executed through the following steps:

Step S21, detach the thread inputting message loop of the child window from the thread inputting message loop of the frame parent window.

Preferably, the thread inputting message loop of the child window is detached from the thread inputting message loop of the frame parent window by using the thread in which the middle window is positioned to call a system API function of AttachThreadInput.

Step S22, set the parent window of the middle window corresponding to the child window to be null.

For example, such a setting may be executed through a statement "SetParent(m_hWnd, NULL);".

Step S23, set the middle window corresponding to the child window to have an attribute of a non-child window. For example, such a setting may be executed through a statement "SetWindowLong(m_hWnd, GWL_STYLE, WS_POPUP|WS_CLIPSIBLINGS);".

Through the above steps, the parent-child relationship between the middle window corresponding to the child window in which window's lagging occurs and the frame parent window may be separated, such that the thread blocked by the child window in which window's lagging occurs would not interfere with the thread of the frame parent window, that is the window system would not go into the window's lagging state.

Step 260, judge whether window's lagging of the child window is eliminated; if window's lagging of the child window is eliminated, go to step 270; otherwise, go to step 280.

Step 270, restore the child window to a child window of the window system.

After window's lagging of the child window is eliminated, the parent-child relationship between the middle window and the child window is restored and the parent-child relationship between the frame parent window and the middle window is restored.

Preferably, the following steps will be used to restore the parent-child relationship between the middle window and the child window in which window's lagging occurs, and restore the parent-child relationship between the frame parent window and the middle window.

Step S31, connect the thread inputting message loop of the child window and the thread inputting message loop of the frame parent window.

Preferably, the thread inputting message loop of the child window and the thread inputting message loop of the frame parent window is connected by using the thread in which the middle window is positioned to call a system API function of AttachThreadInput.

Step S32, set the middle window corresponding to the child window to have an attribute of child window.

Step S33, set the parent window of the middle window corresponding to the child window in which window's lagging occurs to be the frame parent window.

Step 280, end the window system.

Herein, if the child window exits in this process, then detach various parent-child relationships corresponding to the child window, and then destroy the child window.

Preferably, step S51, when the child window exits, detach the parent-child relationship between the middle window and the child window, and detach the parent-child relationship between the frame parent window and the middle window.

S52, destroy the child window and the middle window.

Figure 3:
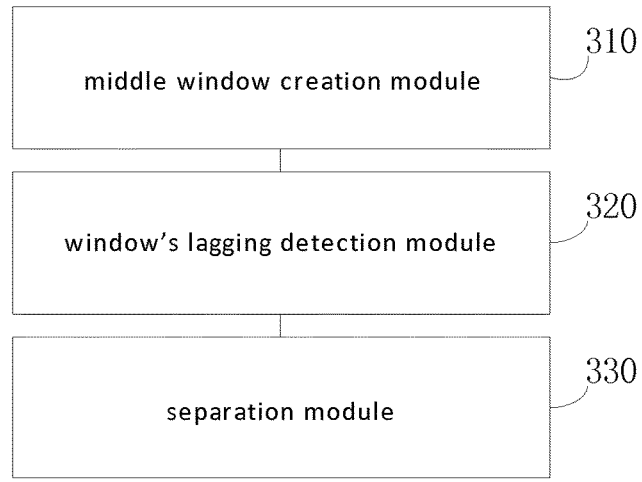
FIG. 3 schematically shows a structural diagram of a device for preventing window's lagging according to an embodiment of the present invention.

Referring to FIG. 3, it shows a device for preventing window's lagging, which comprises:

a middle window creation module 310, configured to create a middle window in a thread different from the thread in which child window is positioned, wherein the middle window is the parent window of the child window, the parent window of the middle window is a frame parent window, and the thread in which the child window is positioned differs from the thread in which the frame parent window is positioned;

a window's lagging detection module 320, configured to detect whether window's lagging of each child window occurs or not, if window's lagging of the child window occurs, send a window's lagging message of the child window in which window's lagging occurs to the thread in which the corresponding middle window is positioned; and a separation module 330, configured to separate the middle window and child window in which window's lagging occurs from a window frame by the thread in which the middle window is positioned.

Herein, the separation may include: separating the parent-child relationship between the middle window and the frame parent window, and the connection relationship between the thread inputting message loop of the child window corresponding to the middle window and the thread inputting message loop of the frame parent window corresponding to the middle window.

Herein, the separation module 330 may include:

a message loop detaching unit, configured to detach the thread inputting message loop of the child window from the thread inputting message loop of the frame parent window;

a first attribute setting unit, configured to set the parent window of the middle window corresponding to the child window to be null; and a second attribute setting unit, configured to set the middle window corresponding to the child window to have an attribute of a non-child window.

Herein, the window's lagging detection module 320 may include:

a window's lagging detecting thread start unit, configured to start a window's lagging detecting thread after the frame parent window starts;

a window handle storing unit, configured to store a window handle of the child window in a queue of the window's lagging detecting thread when the child window is created; and a window's lagging determining unit, configured to detect a timestamp corresponding to the window handle of each child window, wherein the timestamp is refreshed by the thread in which the child window is positioned; if a time period during which the timestamp corresponding to a window handle has not been refreshed exceeds a threshold, determine the corresponding child window to be window's lagging.

Figure 4:
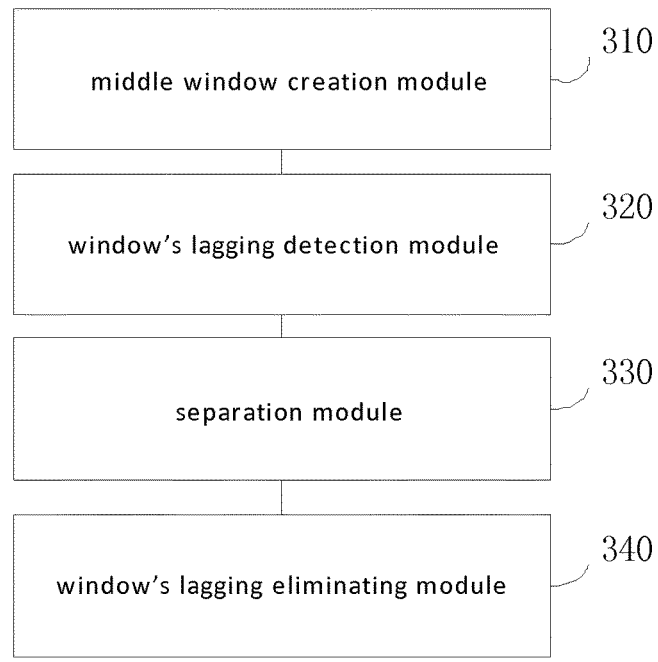
FIG. 4 schematically shows a structural diagram of a device for preventing window's lagging according to an embodiment of the present invention.

In addition, referring to FIG. 4, the present application further comprises:

a window's lagging eliminating module 340, configured to, after window's lagging of the child window is eliminated, restore the parent-child relationship between the middle window and the child window in which window's lagging occurs, and restore the parent-child relationship between the frame parent window and the middle window.

Herein, the window's lagging eliminating module may include:

a message loop connecting unit, configured to connect the thread inputting message loop of the child window and the thread inputting message loop of the frame parent window;

a third attribute setting unit, configured to set the middle window corresponding to the child window to have an attribute of child window; and a fourth attribute setting unit, configured to set the parent window of the middle window corresponding to the child window in which window's lagging occurs to be the frame parent window.

In this embodiment, the device may further comprise:

a pop-up window processing unit, configured to inquire whether a current pop-up window exists in the pop-up window list or not, when the pop-up window is created by the thread in which the child window is positioned; if the current pop-up window exists in the pop-up window list, adjust the current pop-up window to have an attribute of only depending upon the thread in which the child window is positioned.

In addition, the device may further comprise:

a window destroying unit, configured to, when the child window exits, detach the parent-child relationship between the middle window and the child window, and detach the parent-child relationship between the frame parent window and the middle window.

In practice, there are two solutions in the prior art:

In the first solution, logic inclined to window's lagging of the child window is assigned in a background process. When the background process completes drawing contents of the window, then sends the contents of the window to the child window through inter-process communication. The child window is only used to display the contents of the window, which is the easiest and safest event. For this solution, the interface parsing and rendering parts are simply assigned in the background process. However, there are many logics that may cause the window's lagging. For example, as far as a browser in concerned, it may be installed with a plurality of third-party plug-ins, but it may be difficult for the third-party plug-ins to be operated in the background window, such as flash player plug-in. In practice, it is difficult to know the logic which is easy to cause the window's lagging of the child window in advance, such that the logic easy to cause the window's lagging cannot be accurately and completely assigned in the background processes.

In the second solution, child and parent windows are destroyed, the child and parent windows are both set to be top-level windows to completely control a frame parent window by themselves, and the frame parent window simulates an effect of the parent and child windows maintained by the Windows operating system. For example, the parent and child windows for a browser window are destroyed, the child and parent windows are both set to be top-level windows to completely control a frame parent window by themselves, and the browser window simulates an effect of the parent and child windows maintained by the Windows operating system, wherein the effect of the parent and child windows is simulated by controlling a size of the browser window, an order of Z-Order, the active state, etc. For this solution, if the window's lagging of the interface does not occur, due to the destruction of the parent-child window relationship of the Windows, it has brought many problems difficult to be solved, such as window activation status, Z-Order, etc. When window's lagging of the child window occurs, the size and the display state of the child window in which window's lagging occurs are not allowed to change, such that the child window in which window's lagging occurs may maintain the display state at the time of window's lagging, which may affect subsequent use of user. For example, if the extent of the window in which window's lagging occurs covers one or some shortcuts on a Windows desktop, since it is not allowed to change the display state of the window (for example, minimizing the window) suspended in this way, it will cause the user can not use these shortcuts; and since the effect of the parent and child windows is simulated in this way, and the Windows system manages various windows according to the actually existing parent-child relationship, it is possible to cause that another window C is interposed between a parent window A and a child window B which originally have a parent-child relationship, destroying the display relationship between the true parent and child windows.

Since the device embodiment of the present application is substantially similar to the method embodiments, the description thereof is relatively brief. As for the related parts, reference may be made to the corresponding description of the method embodiments.

Each of the embodiments in the specification has been explained step by step. Each of the embodiments has only emphasized the differences from others, and the same or similar explanations between embodiments could be made reference to each other.

Each of components according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the members of the device for preventing window's lagging according to the embodiments of the present invention. The present invention may further be implemented as equipments or device programs (for example, computer programs and computer program products) for executing some or all of the methods as described herein. The programs for implementing the present invention may be stored in the computer readable medium, or have a form of one or more signal. Such a signal may be downloaded from the internet websites, or be provided in carrier, or be provided in other manners.

Figure 5:
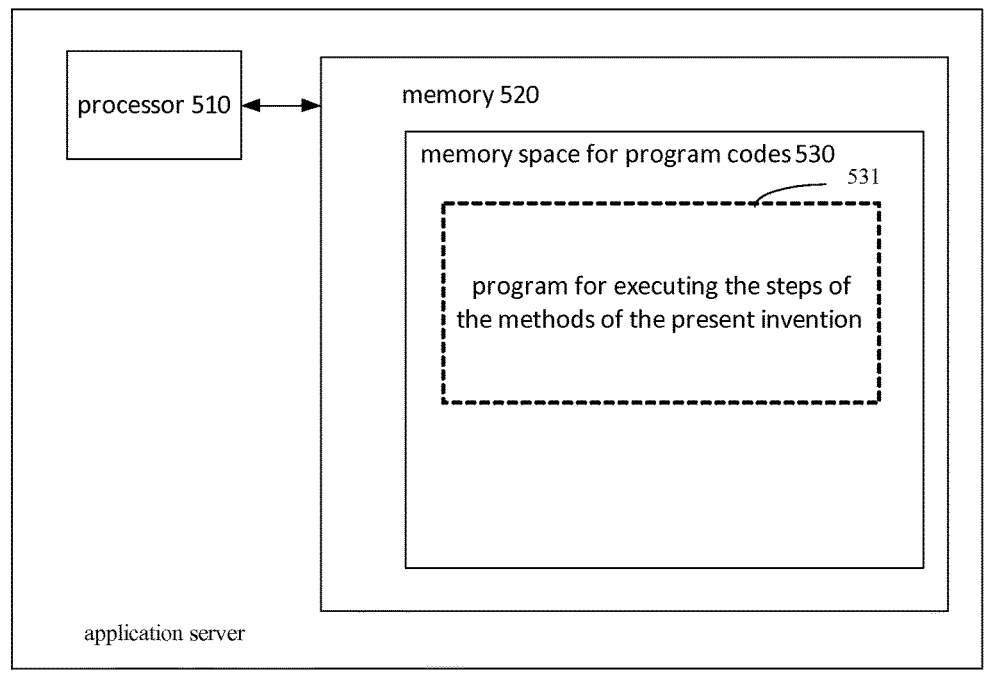
FIG. 5 schematically shows a block diagram a server of for executing the methods according to the present invention.
Figure 6:
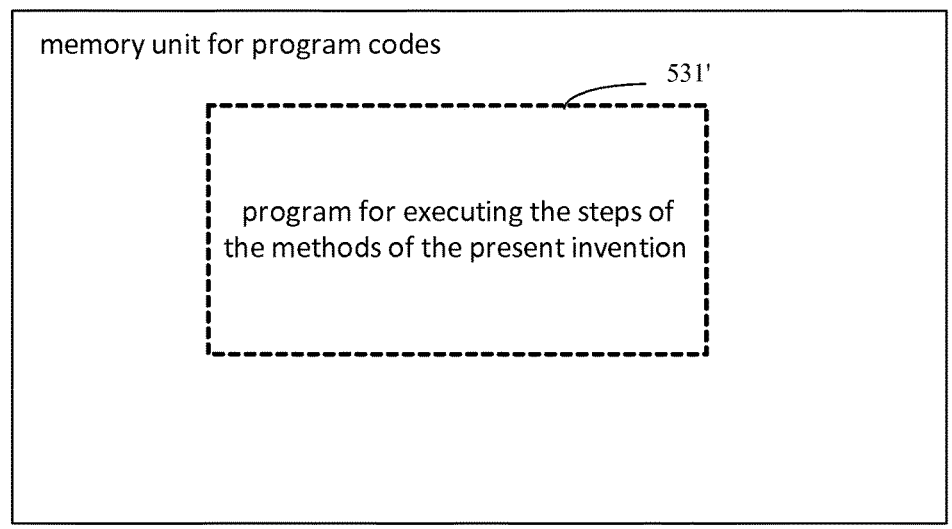
FIG. 6 schematically shows a storage unit for holding or carrying program codes to execute the methods according to the present invention.

For example, FIG. 5 schematically shows a server for implementing the method for preventing window's lagging according to the present invention, such as an application server. Traditionally, the server comprises a processor 510 and a computer program product or a computer readable medium in form of a memory 520. The memory 520 may be electronic memories such as flash memory, EEPROM (Electrically Erasable Programmable Read-Only Memory), EPROM, hard disk or ROM. The memory 520 has a memory space 530 for executing program codes 531 of any steps of the above methods. For example, the memory space 530 for program codes may comprise respective program codes 531 for implementing the various steps in the above mentioned methods. These program codes may be read from or be written into one or more computer program products. These computer program products comprise program code carriers such as hard disk, compact disk (CD), memory card or floppy disk. These computer program products are usually the portable or stable memory cells as shown in reference FIG. 6. The memory cells may be provided with memory sections, memory spaces, etc., similar to the memory 520 of the server as shown in FIG. 5. The program codes may be compressed in an appropriate form. Usually, the memory cell includes computer readable codes 531' which can be read by processors such as 510. When these codes are operated on the server, the server may execute each step as described in the above methods.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it should be understood that the embodiments of the present invention may be practiced without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference symbols between brackets should not form a limit of the claims. The wording "comprising/comprise" does not exclude the presence of elements or steps not listed in a claim. The wording "a" or an in front of element does not exclude the presence of a plurality of such elements. The present invention may be achieved by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

It should also be noticed that the language used in the present specification is chosen for the purpose of readability and teaching, rather than selected in order to explain or define the subject matter of the present invention. Therefore, it is obvious for an ordinary skilled person in the art that modifications and variations could be made without departing from the scope and spirit of the claims as appended. For the scope of the present invention, the disclosure of the present invention is illustrative but not restrictive, and the scope of the present invention is defined by the appended claims.

The invention claimed is:

1. A method for preventing window's lagging, comprising:
when a child window is created by a thread, a middle window being firstly created in a thread different from the thread in which each child window of a window system is positioned, wherein the middle window is the parent window of the child window currently created, the parent window of the middle window is a frame parent window, and the thread in which the child window currently created is positioned differs from the thread in which the frame parent window is positioned;
detecting whether window's lagging of each child window occurs or not, if window's lagging of a child window occurs, a window's lagging message of the child window in which window's lagging occurs being sent to the thread in which the corresponding middle window is positioned; and
the middle window and the child window in which window's lagging occurs are separated from a window frame by the thread in which the middle window is positioned.

2. The method according to claim 1, wherein the separation comprises:
separating the parent-child relationship between the middle window and the frame parent window, and the connection relationship between the thread inputting message loop of the child window corresponding to the middle window and the thread inputting message loop of the frame parent window corresponding to the middle window.

3. The method according to claim 1, wherein the separation comprises the following steps:
detaching the thread inputting message loop of the child window from the thread inputting message loop of the frame parent window;
setting the parent window of the middle window corresponding to the child window to be null; and
setting the middle window corresponding to the child window to have an attribute of a non-child window.

4. The method according to claim 1, wherein the step of detecting whether window's lagging of each child window occurs or not comprises the following steps:
starting a window's lagging detecting thread after the frame parent window starts;
when the child window is created, storing a window handle of the child window in a queue of the window's lagging detecting thread; and
detecting a timestamp corresponding to the window handle of each child window, wherein the timestamp corresponding to the window handle is refreshed by the thread in which the corresponding child window is positioned; if a time period during which the timestamp corresponding to a window handle has not been refreshed exceeds a threshold, determining the corresponding child window to be window's lagging.

5. The method according to claim 1, wherein after the step of the middle window and the child window in which window's lagging occurs are separated from a window frame, the method further comprises:
after window's lagging of the child window is eliminated, restoring the parent-child relationship between the middle window and the child window in which window's lagging occurs, and restoring the parent-child relationship between the frame parent window and the middle window.

6. The method according to claim 5, wherein the step of restoring the parent-child relationship between the middle window and the child window in which window's lagging occurs, and restoring the parent-child relationship between the frame parent window and the middle window, comprises the following steps:
connecting the thread inputting message loop of the child window and the thread inputting message loop of the frame parent window;
setting the middle window corresponding to the child window to have an attribute of child window; and setting the parent window of the middle window corresponding to the child window in which window's lagging occurs to be the frame parent window.

7. The method according to claim 3, wherein,
detaching the thread inputting message loop of the child window from the thread inputting message loop of the frame parent window, by using the thread in which the middle window is positioned to call a system API function of AttachThreadInput; or connecting the thread inputting message loop of the child window and the thread inputting message loop of the frame parent window, by using the thread in which the middle window is positioned to call a system API function of AttachThreadInput.

8. The method according to claim 1, wherein,
inquiring whether a current pop-up window exists in a pop-up window list or not, when the pop-up window is created by the thread in which the child window is positioned; and
if the current pop-up window exists in the pop-up window list, adjusting the current pop-up window to have an attribute of only depending upon the thread in which the child window is positioned.

9. The method according to claim 1, wherein,
when the child window exits, detaching the parent-child relationship between the middle window and the child window, and detaching the parent-child relationship between the frame parent window and the middle window; and
destroying the child window and the middle window.

10. The method according to claim 1, wherein,
the frame parent window is a frame parent window of a browser, and the child window is a window of tab page in the browser.

11. A device for preventing window's lagging, comprising:
a middle window creation module, configured to create a middle window in a thread different from the thread in which child window is positioned, wherein the middle window is the parent window of the child window, the parent window of the middle window is a frame parent window, and the thread in which the child window is positioned differs from the thread in which the frame parent window is positioned;
a window's lagging detection module, configured to detect whether window's lagging of each child window occurs or not, if window's lagging of the child window occurs, send a window's lagging message of the child window in which window's lagging occurs to the thread in which the corresponding middle window is positioned; and
a separation module, configured to separate the middle window and the child window in which window's lagging occurs from a window frame by the thread in which the middle window is positioned.

12. The device according to claim 11, wherein the separation comprises:
separating the parent-child relationship between the middle window and the frame parent window, and the connection relationship between the thread inputting message loop of the child window corresponding to the middle window and the thread inputting message loop of the frame parent window corresponding to the middle window.

13. The device according to claim 11, wherein the separation module comprises:

a message loop detaching unit, configured to detach the thread inputting message loop of the child window from the thread inputting message loop of the frame parent window;
a first attribute setting unit, configured to set the parent window of the middle window corresponding to the child window to be null; and
a second attribute setting unit, configured to set the middle window corresponding to the child window to have an attribute of a non-child window.

14. The device according to claim 11, wherein the window's lagging detection module comprises:
a window's lagging detecting thread start unit, configured to start a window's lagging detecting thread after the frame parent window starts;
a window handle storing unit, configured to store a window handle of the child window in a queue of the window's lagging detecting thread when the child window is created; and
a window's lagging determining unit, configured to detect a timestamp corresponding to the window handle of each child window, wherein the timestamp is refreshed by the thread in which the child window is positioned; if a time period during which the timestamp corresponding to a window handle has not been refreshed exceeds a threshold, determine the corresponding child window to be window's lagging.

15. The device according to claim 11, wherein the device further comprises:
a window's lagging eliminating module, configured to, after window's lagging of the child window is eliminated, restore the parent-child relationship between the middle window and the child window in which window's lagging occurs, and restore the parent-child relationship between the frame parent window and the middle window.

16. The device according to claim 11, wherein the window's lagging eliminating module comprises:
a message loop connecting unit, configured to connect the thread inputting message loop of the child window and the thread inputting message loop of the frame parent window;
a third attribute setting unit, configured to set the middle window corresponding to the child window to have an attribute of child window; and
a fourth attribute setting unit, configured to set the parent window of the middle window corresponding to the child window in which window's lagging occurs to be the frame parent window.

17. The device according to claim 13, wherein
detaching the thread inputting message loop of the child window from the thread inputting message loop of the frame parent window, by using the thread in which the middle window is positioned to call a system API function of AttachThreadInput; or connecting the thread inputting message loop of the child window and the thread inputting message loop of the frame parent window.

18. The device according to claim 11, wherein the device further comprises:
a pop-up window processing unit, configured to inquire whether a current pop-up window exists in the pop-up window list or not, when the pop-up window is created by the thread in which the child window is positioned; if the current pop-up window exists in the pop-up window list, adjust the current pop-up window to have an attribute of only depending upon the thread in which the child window is positioned.

19. The device according to claim 11, wherein the device further comprises:
a window destroying unit, configured to, when the child window exits, detach the parent-child relationship between the middle window and the child window, and detach the parent-child relationship between the frame parent window and the middle window.

20. A computer readable medium, in which a computer program is stored, wherein the computer program comprises a computer readable code, wherein when the computer readable code is run on a computer device, the computer device executes a method for preventing window's lagging, comprising:
when a child window is created by a thread, a middle window being firstly created in a thread different from the thread in which each child window of a window system is positioned, wherein the middle window is the parent window of the child window currently created, the parent window of the middle window is a frame parent window, and the thread in which the child window currently created is positioned differs from the thread in which the frame parent window is positioned;
detecting whether window's lagging of each child window occurs or not, if window's lagging of a child window occurs, a window's lagging message of the child window in which window's lagging occurs being sent to the thread in which the corresponding middle window is positioned; and
the middle window and the child window in which window's lagging occurs are separated from a window frame by the thread in which the middle window is positioned.

* * * * *